(No Model.)

G. W. BROWN.
LUBRICATOR.

No. 391,834. Patented Oct. 30, 1888.

WITNESSES.
R. Henry Marsh.
A. D. Harrison.

INVENTOR.
Gilman W. Brown.
By Wright, Brown & Crosley.
Att'ys.

UNITED STATES PATENT OFFICE.

GILMAN W. BROWN, OF WEST NEWBURY, ASSIGNOR OF ONE-HALF TO CHARLES D. MOSHER, OF AMESBURY, MASSACHUSETTS.

LUBRICATOR.

SPECIFICATION forming part of Letters Patent No. 391,834, dated October 30, 1888.

Application filed June 9, 1888. Serial No. 276,604. (No model.)

*To all whom it may concern:*

Be it known that I, GILMAN W. BROWN, of West Newbury, in the county of Essex and State of Massachusetts, have invented certain new and useful Improvements in Lubricators, of which the following is a specification.

This invention has for its object to provide improved means whereby the discharge of oil from an oil-cup may be regulated by the temperature of the bearing to which the cup is applied; and it consists in the improvements which I will now proceed to describe and claim.

Figure 1:
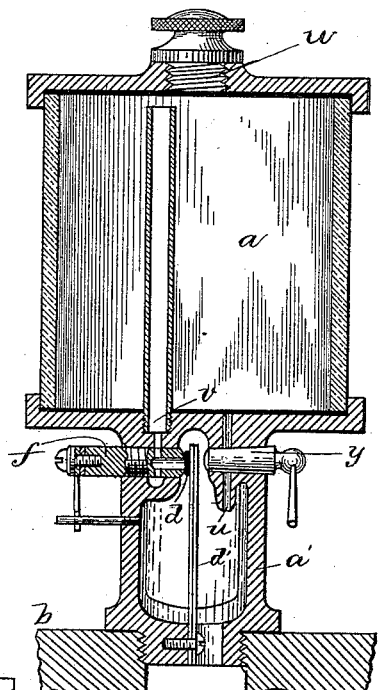
Figure 2:
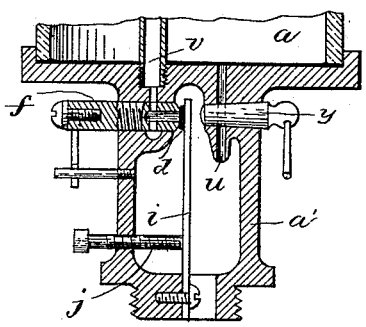

Of the accompanying drawings, forming a part of this specification, Figure 1 represents a vertical section of a lubricator embodying my invention. Fig. 2 represents a sectional view of a modification.

The same letters of reference indicate the same parts in both the figures.

In the drawings, $a$ represents an oil cup or receptacle, and $b$ represents a bearing with which said cup may be connected in any suitable way—as for example, by a shank, $a'$, formed on the cup and screwed into a threaded aperture in the bearing, as shown in Fig. 1, said shank having a conduit through which oil passes from the cup to the bearing. The cup has an oil-discharge orifice, $u$, extending down into the shank $a'$, and an inlet-tube, $v$, extending from a point within the shank upwardly to a point near the top of the oil-receiving space in the reservoir.

In carrying out my invention I provide at any suitable point between the receiving end of the air-inlet and the bearing a thermostatic bar, $d'$, composed of layers or laminæ of different metals, each layer having a different rate of expansion and contraction from that of the other, said bar being constructed and arranged to open the air-inlet and increase the admission of air to the cup when the temperature of the bearing is increased by friction beyond a given degree, thereby increasing the flow of oil through the orifice $u$, and to close the air-inlet when the temperature is reduced by lubrication. The arrangement of said bar may be variously modified. In Fig. 1 I have shown it composed of two metals of different expansibility—as steel and brass, said metals being formed in strips secured together to constitute the bar. One end of said arm is rigidly secured to any suitable support in close proximity to the bearing—as the shank $a'$—while the free end has secured to it a valve, $d$, which may be of metal; or, if preferred, of a suitable yielding material; or, if preferred, the free end of the bar may constitute the valve. The valve bears on the receiving end of the air-inlet, and is separated from said receiving end by the flexure of the thermostatic arm whenever the temperature of the bearing is sufficiently increased to expand the metals of said arm.

The receiving end of the air-inlet is here shown as a tubular screw, $f$, inserted in a threaded socket in the shank $a'$, and passing through the portion of the air-inlet which is formed in said shank. The screw has lateral openings, through which the air passes from the bore of the screw. The screw may be adjusted to compensate for any variations in the normal position of the thermostatic arm $d'$, and insure proper contact of the valve with its seat when said arm is not bent from its normal position. When the shaft is not running, the screw $f$ may be turned so as to cause the valve to entirely stop the admission of air and consequently the flow of oil.

To prevent the escape of oil through the outlet $u$ when the cap or plug $w$ is removed to permit the replenishment of the supply of oil, I provide a cock, $y$, which may be turned to shut off the outlet $u$. When the plug $w$ is in place, the cock $y$ is kept open. It will be observed that the valve is moved by a multiplication of the difference between the expansion of the brass and steel layers, the means whereby said multiplication is produced being the location of the brass strip (which is the more rapidly expanding element of the bar) on the side next the air-inlet and the freedom of the end of the bar to move away from said inlet. It will be seen, however, that the movement of the valve may be produced by a multiplication of the difference between the expansion of two metals under various other mechanical arrangements. In Fig. 2 I have shown the valve supported by an arm, $i$, which may be of any suitable material. Against said arm bears a stud, *j*, affixed to the shank *a'* of the cup and composed of a metal having a greater coefficient of expansion than the shank, the stud being, for example, of zinc and the shank of brass. Under this arrangement the difference between the expansion of the stud and shank would cause the stud to force the arm *i* away from the air-inlet, and the said difference would be multiplied by the length of the arm *i* between the point where the stud *j* bears on said arm and the valve *d*. In this case the coefficient of expansion of the arm *i* becomes of no importance, as the expansion of said arm has no effect.

In Letters Patent of the United States, granted to me May 15, 1888, No. 382,752, I have shown a thermostatic arm or bar arranged to control the escape of oil from an oil-cup by acting directly on the oil-outlet instead of on an air-inlet, as here shown.

It is obvious that the principle of the multiplication of the difference between the expansion of two metals is also embodied in the construction shown in my said former patent. I do not therefore limit myself to the use of the elements having different expanding coefficients and means for multiplying the difference between the expansion of said elements in connection with a lubricator in which the escape of oil from the cup is governed by the admission of air thereto.

I claim—

1. The combination of an oil cup or reservoir having an oil outlet or passage, a valve, and a plurality of valve-controlling metallic elements having different coefficients of expansion and arranged to multiply the difference between their rates of expansion, as set forth.

2. An oil cup or receptacle having an oil-outlet, an air-inlet controlling the escape of oil from said outlet, and a thermo-dynamic valve regulating the admission of air through said inlet, as set forth.

3. An oil cup or receptacle having an oil-outlet, an air-inlet controlling the escape of oil from said outlet, a thermo-dynamic valve controlling the admission of air through said inlet, and a cock or stop for said outlet, as set forth.

In testimony whereof I have signed my name to this specification, in the presence of two subscribing witnesses, this 5th day of June, A. D. 1888.

GILMAN W. BROWN.

Witnesses:
C. F. BROWN,
A. D. HARRISON.